John J. Schillinger's Impd Pavement.

4364

REISSUED MAY 2 1871

Witnesses:
E. F. Kastenhuber
C. Wahlers.

Inventor:
John J. Schillinger

UNITED STATES PATENT OFFICE.

JOHN J. SCHILLINGER, OF NEW YORK, N. Y.

IMPROVEMENT IN CONCRETE PAVEMENTS.

Specification forming part of Letters Patent No. 105,599, dated July 19, 1870; Reissue No. 4,364, dated May 2, 1871.

*To all whom it may concern:*

Be it known that I, JOHN J. SCHILLINGER, of the city, county, and State of New York, have invented a new and useful Improvement in Concrete Pavements; and I do hereby declare the following to be a full, clear, and exact description thereof, which will enable those skilled in the art to make and use the same, reference being had to the accompanying drawings, forming part of this specification, in which drawing—

Figure 1:
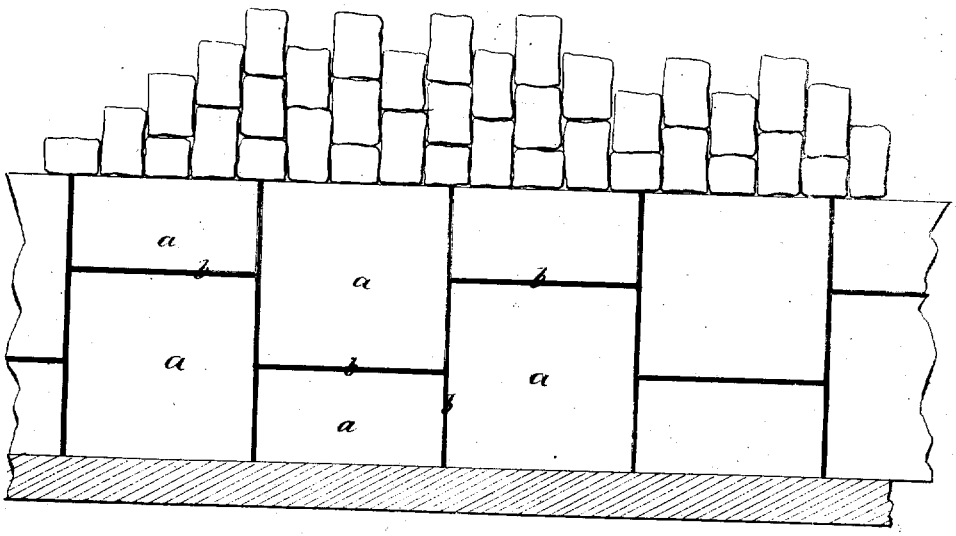
Figure 2:
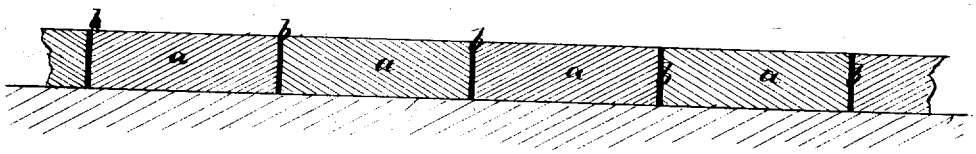

Figure 1 represents a plan of my pavement. Fig. 2 is a vertical section of the same.

Similar letters indicate corresponding parts.

This invention relates to a concrete pavement which is laid in sections, so that each section can be taken up and relaid without disturbing the adjoining sections. With the joints of this sectional concrete pavement are combined strips of tar paper, or equivalent material, arranged between the several blocks or sections in such a manner as to produce a suitable tight joint and yet allow the blocks to be raised separately without affecting the blocks adjacent thereto.

In carrying out my invention, I form the concrete by mixing cement with sand and gravel or other suitable materials to form a plastic compound, using about the following proportions: one part, by measure, of cement, one part, by measure, of sand, and from three to six parts, by measure, of gravel, with sufficient water to render the mixture plastic; but I do not confine myself to any definite proportions or materials for making the concrete composition.

While the mass is plastic I lay or spread the same on the foundation or bed of the pavement, either in molds or between movable joists of the proper thickness, so as to form the edges of the concrete blocks *a a*, one block being formed after the other. When the first block has set, I remove the joists or partitions between it and the block next to be formed, and then I form the second block, and so on, each succeeding block being formed after the adjacent blocks have set, and, since the concrete in setting shrinks, the second block when set does not adhere to the first, and so on, and when the pavement is completed each block can be taken up independent of the adjoining blocks. Between the joints of the adjacent blocks are placed strips *b* of tar paper or other suitable material in the following manner: After completing one block, *a*, I place the tar paper *b* along the edge where the next block is to be formed; and I put the plastic composition for such next block up against the tar-paper joint, and proceed with the formation of the new block until it is completed. In this manner I proceed until the pavement is completed, interposing tar paper between the several joints as described. The paper constitutes a tight water-proof joint, but it allows the several blocks to heave separately from the effects of frost or to be raised or removed separately whenever occasion may arise, without injury to the adjacent blocks.

The paper when placed against the block first formed does not adhere thereto, and therefore the joints are always free between the several blocks, although the paper may adhere to the edges of the block or blocks formed after the same has been set up in its place between the joints.

In such cases, however, where cheapness is an object, the tar paper may be omitted and the blocks formed without interposing anything between their joints, as previously described. In this latter case the joints soon fill up with sand or dust, and the pavement is rendered sufficiently tight for many purposes, while the blocks are detached from each other and can be taken up and relaid, each independent of the adjoining blocks.

What I claim as new, and desire to secure by Letters Patent, is—

1. A concrete pavement laid in detached blocks or sections, substantially in the manner shown and described.

2. The arrangement of tar paper, or its equivalent, between adjoining blocks of concrete, substantially as and for the purpose set forth.

JOHN J. SCHILLINGER.

Witnesses:

W. HAUFF,

E. F. KASTENHUBER.